United States Patent Office 3,725,256
Patented Apr. 3, 1973

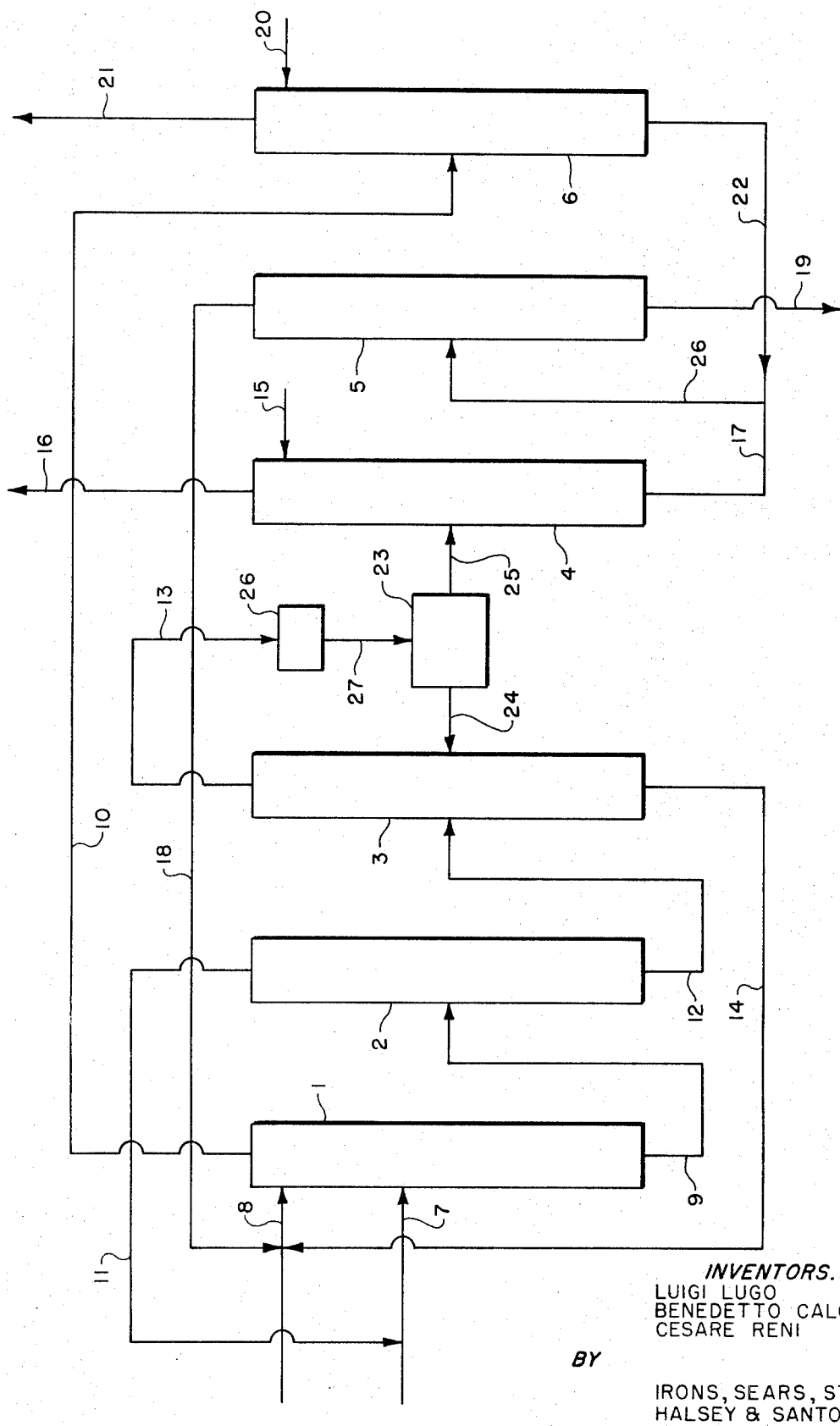

3,725,256
PROCESS FOR SEPARATING AROMATIC HYDRO-CARBONS FROM MIXTURES THEREOF WITH PARAFFINS AND NAPHTHENE HYDROCARBONS
Luigi Lugo, Benedetto, Calcagno, and Cesare Reni, Milan, Italy, assignors to Societa Italiana Resine, S.p.A., Milan, Italy
Filed May 4, 1971, Ser. No. 140,202
Claims priority, application Italy, May 12, 1970, 24,463/70
Int. Cl. C07c 7/10; C10g 21/20
U.S. Cl. 208—331                                    9 Claims

ABSTRACT OF THE DISCLOSURE

Aromatic hydrocarbons are separated from a mixture of liquid hydrocarbons. The mixture of liquid hydrocarbons is extracted in the liquid phase in an extraction zone with ethylenediamine having a water content of from 0% to 20% by weight to form an extracted phase and a raffinate phase. The extracted phase comprises predominantly aromatic hydrocarbons, solvent, and a minor amount of non-aromatic hydrocarbons. The raffinate phase comprises predominantly non-aromatic hydrocarbons. The extracted phase and the raffinate phase are separately collected. The non-aromatic hydrocarbons in said extracted phase are separated as overhead product by means of extractive stripping of the extracted phase, the aromatic hydrocarbons remaining in the residue of the extractive stripping. The residue of the extractive stripping is azeotropically distilled, the aromatic hydrocarbons and a minor amount of ethylenediamine solvent being collected as the overhead products. The ethylenediamine solvent is collected as the bottom product. The overhead products are cooled to separate them into an ethylenediamine containing phase and an aromatic hydrocarbons containing phase. The aromatic hydrocarbons containing phase is scrubbed with water to separate out a dilute aqueous ethylenediamine containing phase, and aromatic hydrocarbons phase, which is then rectified.

BACKGROUND OF THE INVENTION

Field of the invention

This invention relates to a means of separating aromatic hydrocarbons from a mixture thereof with paraffins and naphthene hydrocarbons by means of extraction with a selective solvent. This present invention is particularly concerned with separating aromatic hydrocarbons, such as benzene, toluene and xylene, from liquid hydrocarbon mixtures containing them.

Description of the prior art

There are several known methods employed on an industrial scale for separating mixtures of organic compounds which contain at least one constituent relatively soluble in a liquid solvent, by contacting the liquid mixtures with a liquid solvent in order to separate a raffinate phase from an extracted phase.

Previous methods have effected the separation by conveying the liquid mixtures to a liquid-liquid extractor countercurrent to a selective solvent. A raffinate phase and an extracted phase are collected, the raffinate phase consisting essentially of non-aromatic hydrocarbons, and the extracted phase having a high solvent and aromatic hydrocarbon content and a relatively low non-aromatic hydrocarbon content.

A number of high-boiling solvents have been used as the selective solvent in the extractive step. Among the solvents used in the past on the industrial scale are diethylene glycol, dipropylene glycol, and sulfolane.

It is known to vary the selectivity of such solvents by adding a non-solvent such as water.

Even where a non-solvent is employed, there has been an appreciable loss to the raffinate phase of the aromatic hydrocarbons which it is desired to isolate. The extracted phase always contained relatively high quantities of non-aromatic hydrocarbons which must be separated in order to obtain the aromatic hydrocarbons in pure form.

Various processes have been employed to separate the aromatic hydrocarbons from the solvent and non-aromatic hydrocarbons in the extracted phase. For example, the extracted phase is conveyed to an extractive distillation column in which the non-aromatic products are separated at the top of the column, the aromatic constituents are withdrawn, laterally, and the solvent is withdrawn at the bottom of the column.

The non-aromatic products, with the solvent, are recycled to the extractor, and the aromatic hydrocarbons which have been isolated are rectified. In most instances, the extractive distillation step required by these methods must be carried out using steam in a vacuum.

Previous processes have also required the recycling of large amounts of aromatic products to the extractor together with the paraffinic products which are distilled from the extracted phase. Such processes have not been economical because of the expense required to provide large quantities of steam which were employed in order to separate the aromatic hydrocarbons from the solvent in the extract.

U.S. Pat. No. 2,407,820 discloses the extraction of aromatic hydrocarbons from a mixture of hydrocarbons containing them by the use of selective solvent such as sulfolane followed by extractive distillation of the extracted phase in order to isolate the aromatic hydrocarbons.

British Pat. 739,200 discloses a process for separation of aromatic hydrocarbons from a mixture thereof with non-aromatic hydrocarbons by extraction of the aromatic hydrocarbons from the mixture with a glycolic selective solvent, and then treating the aromatic rich glycolic extract by pre-stripping the extract under evaporative conditions to liberate the most volatile aromatics therefrom together with non-aromatics of equivalent volatility, and thereafter conducting the remaining extract to a heated zone and stripping the aromatic hydrocarbons from the solvent in the heated zone.

Cumming and Morton in the Journal of Applied Chemistry, Aug. 3, 1953, disclose the use of ethylenediamine for extracting benzene from n-hexane on a laboratory scale. Repeated extractions are required to obtain a benzene-free raffinate, but a hexane-free extract of benzene is not attained.

GENERAL DESCRIPTION OF THE INVENTION

The above disadvantages of the prior art have been overcome by the process of this invention.

According to the present invention, there is provided an improved process of separating aromatic hydrocarbons from a mixture thereof with paraffinic and naphthene hydrocarbons by a unique combination of steps which provides an economical means of separating the aromatic hydrocarbons from mixtures thereof and obtaining such aromatic hydrocarbons in a high degree of purity in high yields.

By the process of this invention, a mixture containing the aromatic hydrocarbons is fed to a liquid-liquid extraction zone wherein the aromatic hydrocarbons are extracted by means of ethylenediamine as the selective solvent and are thereafter recovered by extractively stripping the non-aromatic hydrocarbons from the extract and then azeotropically distilling the remaining extracted phase. The aromatic hydrocarbons mixture obtained therefrom is thereafter scrubbed with water to remove the residual aqueous ethylenediamine, and the aromatic hydrocarbons are then rectified.

The process of this invention, in brief, comprises:

(a) charging the liquid mixture containing the aromatic hydrocarbons to an extraction zone countercurrent to the ethylenediamine selective solvent;
(b) drawing from the extraction zone a liquid extracted phase loaded with aromatic hydrocarbons and a liquid raffinate phase comprising essentially the non-aromatic hydrocarbons;
(c) separating from the extracted phase the non-aromatic hydrocarbons by means of extractive stripping; and
(d) azeotropically distilling the aromatic hydrocarbons from the residue of the extractive stripping in step (c).

The ethylenediamine solvent drawn from the bottom of the azeotropic distillation column may be recycled to the extraction zone. The overhead products of the azeotropic distillation, that is, the aromatic hydrocarbons with some ethylenediamine solvent, are cooled to separate the aqueous ethylenediamine phase from the aromatic hydrocarbon phase which is further treated to remove residual solvent by means of a water scrubbing.

The aromatic hydrocarbon phase obtained after the scrubbing is ultimately rectified to obtain the desired degree of purity of the aromatic hydrocarbons that have been thus separated.

DESCRIPTION OF THE PREFERRED EMBODIMENTS

The process of this invention is shown diagrammatically in the accompanying drawing which is a flow sheet of the steps involved in the practice of this invention. As indicated, this invention provides an economical and efficient means for separating aromatic hydrocarbons from mixtures thereof with non-aromatic hydrocarbons on an industrial scale using ethylenediamine as a specific selective solvent in a novel combination of processing steps.

According to this invention, therefore, aromatic hydrocarbons are separated from a mixture thereof with paraffins and naphthene hydrocarbons by a process comprising the steps of:

(i) extracting said mixture of liquid hydrocarbons in the liquid phase in an extraction zone with ethylenediamine solvent having a water content of from 0% to 20% by weight to form an extracted phase and a raffinate phase, said extracted phase comprising predominantly aromatic hydrocarbons and solvent and a minor amount of non-aromatic hydrocarbons, said raffinate phase comprising predominantly non-aromatic hydrocarbons;
(ii) separately collecting said extracted phase and said raffinate phase;
(iii) separating the non-aromatic hydrocarbons in said extracted phase as overhead product by means of extractive stripping of said extracted phase, said aromatic hydrocarbons remaining in the residue of the extractive stripping;
(iv) azeotropically distilling said residue of the extractive stripping step (iii), said aromatic hydrocarbons and a minor amount of ethylenediamine solvent being collected as the overhead products of the azeotropic distillation, and ethylenediamine solvent collected as the bottom product;
(v) cooling said overhead products of the azeotropic distillation step (iv) to separate said overhead products into an ethylenediamine containing phase and an aromatic hydrocarbons containing phase;
(vi) scrubbing said aromatic hydrocarbons containing phase with water to separate out a dilute aqueous ethylenediamine containing phase and aromatic hydrocarbons phase; and
(vii) rectifying said aromatic hydrocarbons phase.

The ethylenediamine solvent may be employed in an anhydrous form or with up to 20% by weight of water. It is preferred that the extraction be carried out using ethylenediamine with a water content of from about 2 to 15% by weight. It has been found that using ethylenediamine with this amount of water, the best conditions in regard to solvent selectivity and solubility towards the aromatic hydrocarbons is obtained.

It is essential that low ratios of solvent to the feed charge be maintained. Generally ratios between 1:1 and 4:1 by weight are recommended. Higher ratios may be used, of course, for example, up to 7:1 when the ethylenediamine employed has a high water content.

The extraction is preferably carried out at temperatures between room temperature and 80° C. and at atmospheric pressure. It is possible, although not convenient, to operate at a temperature above 80° C. and at pressures higher than atmospheric pressure, but such is not recommended.

It is recommended that an extractor be employed which has approximately 5 to 15 theoretical trays.

The raffinate phase which is separated in the selective extraction step comprises essentially non-aromatic hydrocarbons. The extracted phase has a non-aromatic hydrocarbon content of less than 1% by weight.

The extracted phase containing predominantly aromatic hydrocarbons is then subjected to an extractive stripping step at atmospheric pressure in order to separate the remaining non-aromatic hydrocarbons from the aromatic hydrocarbons and solvent.

The aromatic hydrocarbons are then separated from the ethylenediamine solvent by azeotropically distilling at atmospheric pressure the residue from the extractive stripping step. The ethylenediamine solvent is collected at the bottom of the azeotropic distillation column and recycled to the extraction zone. The overhead products from the azeotropic distillation are preferably cooled in order to effect separation into an aqueous ethylenediamine containing phase, and an aromatic hydrocarbon containing phase.

The aqueous ethylenediamine containing phase is recycled to the azeotropic distillation column.

The aromatic hydrocarbon containing phase is then scrubbed with water in amounts from 0.5 to 10% by weight in a scrubbing column in order to remove the remaining ethylenediamine solvent from it. The aromatic hydrocarbons obtained are thereafter rectified.

In another aspect of the invention, the overhead products of the azeotropic distillation column are scrubbed countercurrent to water for separating an aromatic hydrocarbon phase from an aqeuous ethylenediamine containing phase without the intervening cooling and separation step.

The raffinate phase which is originally collected from the extraction zone is scrubbed by means of water in order to separate the small amount of solvent which is contained therein. The water is added in amounts such that the aqueous ethylenediamine phase which is collected has a water content of less than 50% by weight.

Prior to recycling the ethylenediamine solvent solution to the extraction zone, the solution is distilled. The aqueous ethylenediamine is distilled according to the methods known to the art, for example, that disclosed in U.S. Pat. 3,454,645.

Using the process of this invention, there are obtained aromatic hydrocarbons which are at least 99.5% pure. They are obtained in unusually high yields compared to those of prior art methods.

The process of this invention may be employed to recover a single aromatic hydrocarbon from liquid mixtures containing it such as benzene from hydrogenated reforming gasoline, or mixtures of several aromatic hydrocarbons can be recovered from liquid hydrocarbon mixtures containing them.

In the accompanying drawing, there is shown a schematic diagram of the steps employed in the process of this invention. The apparatus employed is all of a conventional nature familiar to those in the art and is thus not shown in detail.

Referring to the drawing, a conventional multistage extractor 1 such as a perforated tray column, or a column containing a packing material or a rotating disc contactor is employed for the extraction step. The liquid hydrocarbon mixture containing the aromatic hydrocarbons to be separated is fed to the extractor 1 through a feed line 7 at a point intermediate the top and the bottom of the extractor 1. The selective solvent comprising ethylenediamine is fed to the extractor 1 through a feed line 8 at the end of the extractor 1 at which the raffinate phase is collected.

The extracted phase, containing predominantly aromatic hydrocarbons, is collected at the bottom of the extractor 1. This extracted phase containing the aromatic hydrocarbon is then fed through line 9 from the extractor 1 to a standard extractive stripping column 2. The extractive stripping column 2 is operated at atmospheric pressure.

The non-aromatic hydrocarbons are collected at the top of the extractive stripping column 2 as overhead product and then are recycled to the extractor 1 through line 11 and then through feed line 7 with the hydrocarbon mixture.

The liquid containing the aromatic hydrocarbons is drawn from the bottom of stripping column 2 and then fed through line 12 to an azeotropic distillation column 3.

The aromatic hydrocarbons are separated in the azeotropic distillation column 3 as the overhead product together with a portion of the ethylenediamine solvent. This aromatic hydrocarbons overhead product is then fed to heat exchanger 26 through line 13 and cooled, and then fed by line 27 to decanter vessel 23 to separate the aromatic hydrocarbons phase and ethylenediamine containing phase. The aromatic hydrocarbons phase is then fed to the scrubbing column 4 through line 25 and is scrubbed countercurrent to water which is fed through a feed line 15.

The separated ethylenediamine solvent phase can be recycled to the distillation column 3 by means of a return line 24.

Alternatively, all of the overhead product from the azeotropic distillation column 3 may be fed directly to column 4 without the intervening separation of an aromatic hydrocarbons phase and ethylenediamine containing phase although such is not preferred.

At the top of the scrubbing column 4 the aromatic hydrocarbons are collected at line 16 and thereafter rectified.

An aqueous ethylenediamine containing phase is collected at the bottom of the scrubbing column 4 and fed to distilling column 5 through lines 17 and 26 and distilled in column 5 according to the methods disclosed in U.S. Pat. No. 3,545,645 referred to above.

The ethylenediamine solvent which is obtained at the bottom of the azeotropic distillation column 3 is recycled through return line 14 to the extractor 1.

The raffinate phase which was collected at the top of extractor column 1 is fed from the top of the extractor column 1 through line 10 to a scrubbing column 6 to which water is fed through line 20. A solvent-free raffinate phase is collected at the top of the scrubbing column 6 at line 21 and the aqueous ethylenediamine containing phose is drawn off at the bottom of the scrubbing column 6 and fed through lines 22 and 26 to the distillation column 5 with the other aqueous ethylenediamine containing phase from the scrubber column 4. The distilled ethylenediamine solvent is then recycled from the distilling column 5 to the extractor column 1 through return line 18.

A mixture of hydrocarbons containing benzene, toluenes and xylenes in amounts of about 55% by weight together with non-aromatic hydrocarbons having a carbon length of between 6 and 8 and comprising approximately 45% by weight of the mixture, is separated according to the process of this invention as follows:

The mixture to be separated is fed through the feed line 7 to the extractor 1 at a rate of about 100 kg./hr. The extractor in this case is a rotating disc contactor having 12 theoretical trays. The hydrocarbon mixture is fed to the extractor at the point of the forth theoretical tray counting from the end from which the raffinate phase is collected.

Overhead products which are removed from the extractive stripping column 2 as described above are fed into the feed line 7 with the fresh mixture of hydrocarbons. The non-aromatic hydrocarbons are recycled to the extractor at the rate of about 1 kg./hr.

Aqueous ethylenediamine having a water content of about 9.3% by weight is fed to the extractor 1 through feed line 8 at the rate of about 56 kg./hr. at the first theoretical tray at the end from which the raffinate phase is collected.

The temperature of the extractor is maintained at about 60° C. and atmospheric pressure.

The raffinate phase which is drawn from the top of the extractor 1 through the line 10 has a composition as follows:

| | Percent by weight |
|---|---|
| Aromatic hydrocarbons | 2.5 |
| Non-aromatic hydrocarbons | 90.5 |
| Solvent | 7.0 |

The extracted phase which is drawn from the bottom of the extractor 1 through line 9 has the following average composition:

| | Percent by weight |
|---|---|
| Aromatic hydrocarbons | 26.0 |
| Non-aromatic hydrocarbons | 0.5 |
| Solvent | 73.5 |

The extracted phase is then fed to an extractive stripping column 2 in which the non-aromatic hydrocarbons are separated from the extracted phase at atmospheric pressure.

The residue from the extractive stripping column 2 is drawn off at the bottom of column 2 by means of line 12 and fed to the azeotropic distillation column 3 where it is azeotropically distilled at atmospheric perssure. An overhead product from the azeotropic distillation column 3 is collected which contains aromatic hydrocarbons and some aqueous ethylenediamine. This overhead product is fed to heater exchange 26 by line 13 and cooled, and then by line 24 to decanter 23 so as to separate an aqueous ethylenediamine containing phase which is recycled to the column 3 by means of return line 24 from the aromatic hydrocarbon containing phase is fed by line 25 to scrubber column 4 and is scrubbed countercurrent to water, the water being fed to column 4 by feed line 15.

The aromatic hydrocarbons are drawn from the top of scrubbing column 4 through line 16 at the rate of about 53 kg./hr. and thereafter rectified. Following rectification, the aromatic hydrocarbons are obtained and are 99.9% pure.

The bottom products, comprising ethylenediamine solvent, of the azeotropic distillation column 3 are recycled to the extractor 1 through line 14.

The raffinate phase which is collected at the top of the extractor column 1 is treated in the scrubbing column 6 countercurrent to water which is fed to the column 6 through the feed line 20 at the rate of about 1 kg./hr.

The solvent-free raffinate is drawn from the top of the scrubbing column 6 through line 21 and the aqueous ethylenediamine containing phase is drawn from the bottom of the scrubbing column 6 and fed to distillation column 5 by means of lines 22 and 26, where it is distilled according to the process of U.S. Pat. 3,454,645. The ethylenediamine solvent is then recycled from the column 5 to the extractor 1 through line 18.

What is claimed is:

1. A process for separating aromatic hydrocarbons from a mixture of liquid hydrocarbons comprising said aromatic hydrocarbons, paraffins and naphthene hydrocarbons, which process comprises the steps:
   (i) extracting said mixture of liquid hydrocarbons in the liquid phase in an extraction zone with ethylenediamine solvent having a water content of from 0% to 20% by weight to form an extracted phase and a raffinate phase, said extracted phase comprising predominantly aromatic hydrocarbons and solvent and a minor amount of non-aromatic hydrocarbons, said raffinate phase comprising predominantly non-aromatic hydrocarbons;
   (ii) separately collecting said extracted phase and said raffinate phase;
   (iii) separating the non-aromatic hydrocarbons in said extracted phase as overhead product by means of extractive stripping of said extracted phase, said aromatic hydrocarbons remaining in the residue of the extractive stripping;
   (iv) azeotropically distilling said residue of the extractive stripping step (iii), said aromatic hydrocarbons and a minor amount of ethylenediamine solvent being collected as the overhead products of the azeotropic distillation, and ethylenediamine solvent as the bottom product;
   (v) cooling said overhead products of the azeotropic distillation step (iv) to separate said overhead products into an ethylenediamine containing phase and and an aromatic hydrocarbons containing phase;
   (vi) scrubbing said aromatic hydrocarbons containing phase with water to separate out a dilute aqueous ethylenediamine containing phase and aromatic hydrocarbons phase; and
   (vii) rectifying said aromatic hydrocarbons phase.

2. A process as claimed in claim 1 wherein said extracting step (i) is carried out at a temperature between room temperature and 80° C.

3. A process as claimed in claim 1 wherein said ethylenediamine solvent of step (i) has a water content of from about 2% to about 15% by weight.

4. A process as claimed in claim 1 wherein the ratio of ethylenediamine solvent to said mixture of liquid hydrocarbons in step (i) is from 1:1 to 4:1 by weight.

5. A process as claimed in claim 2 wherein said ethylenediamine solvent of step (i) has a water content of from about 2% to about 15% by weight and wherein the ratio of ethylenediamine solvent to said mixture of liquid hydrocarbons in step (i) is from 1:1 to 4:1 by weight.

6. A process as claimed in claim 1 wherein the non-aromatic hydrocarbons separated in extractive stripping step (iii) as overhead products are recycled to the extraction zone of step (i); the ethylenediamine solvent bottom product of step (iv) is recycled to the extraction zone in step (i); said raffinate phase separated in step (ii) is scrubbed with water and there is obtained an ethylenediamine-free raffinate phase of non-aromatic hydrocarbons and an aqueous ethylenediamine containing phase.

7. A process as claimed in claim 6 wherein the aqueous ethylenediamine containing phases of step (vi) and that obtained by scrubbing the raffinate phases are distilled, and the ethylenediamine obtained thereby is recycled to the extraction zone in step (i).

8. A process as claimed in claim 7 wherein said ethylenediamine containing phase of step (v) is recycled in the azeotropic distillation step (iv).

9. A process for separating aromatic hydrocarbons from a mixture of liquid hydrocarbons comprising said aromatic hydrocarbons, paraffins and naphthene hydrocarbons, which process comprises the steps:
   (i) extracting said mixture of liquid hydrocarbons in the liquid phase in an extraction zone with ethylenediamine solvent having a water content of from 0% to 20% by weight to form an extracted phase and a raffinate phase, said extracted phase comprising predominantly aromatic hydrocarbons and solvent and a minor amount of non-aromatic hydrocarbons, said raffinate phase comprising predominantly non-aromatic hydrocarbons;
   (ii) separately collecting said extracted phase and said raffinate phase;
   (iii) separating the non-aromatic hydrocarbons in said extracted phase as overhead product by means of extractive stripping of said extracted phase, said aromatic hydrocarbons remaining in the residue of the extractive stripping;
   (iv) azeotropically distilling said residue of the extractive stripping step (iii), said aromatic hydrocarbons and a minor amount of ethylenediamine solvent being collected as the overhead products of the azeotropic distillation, and ethylenediamine solvent as the bottom product;
   (v) scrubbing the overhead products of step (iv) with water to separate out a dilute aqueous ethylenediamine containing phase and an aromatic hydrocarbon phase; and
   (vi) rectifying said aromatic hydrocarbon phase.

References Cited
UNITED STATES PATENTS

| | | | |
|---|---|---|---|
| 3,639,496 | 2/1972 | Rozman | 260—674 SE |
| 2,999,892 | 9/1961 | Papadopoulos et al. | 260—674 SE |
| 3,291,728 | 12/1966 | Boyum | 208—331 |
| 3,209,047 | 9/1965 | Young | 260—674 SE |
| 3,431,199 | 3/1969 | Reni et al. | 260—674 SE |

WILBUR L. BASCOMB, JR., Primary Examiner

U.S. Cl. X.R.

203—39, 59, 84, 53; 260—674 SE